United States Patent Office 3,542,815
Patented Nov. 24, 1970

3,542,815
POLYMERIZATION OF ACONITIC ANHYDRIDE
John H. Blumbergs, Highland Park, and Donald G. Mac-Kellar, Trenton, N.J., assignors to FMC Corporation, New York, N.Y., a corporation of Delaware
No Drawing. Filed Sept. 10, 1968, Ser. No. 758,670
Int. Cl. C07k 57/02
U.S. Cl. 260—346.8                4 Claims

ABSTRACT OF THE DISCLOSURE

Aconitic anhydride is homopolymerized by heating said anhydride at a temperature of at least about 80° C. in the presence of an initiating amount of a mixed aconitic-acyl peroxide.

BACKGROUND OF THE INVENTION

A.—Field of the invention

This invention relates to homopolymers of aconitic anhydride and particularly with a method for initiating the formation of such homopolymers.

B.—Description of the prior art

It is reported that aconitic anhydride can be homopolymerized to form polymers having molecular weights of from about 350 to about 1,500,000 and preferably 500 to about 175,000. Homopolymers of aconitic anhydride and especially the derivatives thereof, e.g., polymerized aconitic acid and water-soluble salts thereof, have been reported to be effective as builders in detergent formulations in U.S. Pat. 3,308,067 issued to Francis Diehl on Mar. 7, 1967. They are also useful as additives to polymer systems and in the surface treatment of metals.

However, the homopolymerization of aconitic anhydride, from which aconitic acid and its salt are obtained, is difficult to initiate, and special polymerization techniques must be employed to obtain a satisfactory product. While certain additives, such as acetyl peroxide, or special processing techniques, such as using high pressures, have been suggested to initiate polymerization of anhydrides, these have serious drawbacks in commercial operations. Initially, the use of acetyl peroxide as a polymerization inhibitor has as its main drawback that this compound is shock-sensitive and can be detonated by rough handling or by being dropped. This is most serious because it means that one of the essential ingredients used in the synthesis must be handled with great care to avoid detonating the shock-sensitive acetyl peroxide.

Another drawback to the use of acetyl peroxide is that, at present, it is commercially available only as a solution in dimethyl phthalate. The dimethyl phthalate solvent accordingly must be added along with the acetyl peroxide to the aconitic anhydride compound, and the dimethyl phthalate contaminates the final product. To remove the dimethyl phthalate, an expensive organic solvent procedure is required to isolate the product from the dimethyl phthalate.

While this is of no moment in the small scale laboratory preparation of poly(aconitic anhydride), it poses a major problem to utilization of this process. In the plant operation the dimethyl phthalate solvent must be separated from the acetyl peroxide or from the final poly(aconitic anhydride) product.

Other known procedures for initiating homopolymerization of anhydrides, such as the use of high pressures, is not desirable in commercial operation, since it would require specialized, costly equipment built to withstand the high pressures necessary to initiate polymerization reaction. This specialized, expensive equipment would increase materially the capital cost of operating such a process. As a result, the art is in need of a more simplified, workable system for homopolymerizing aconitic anhydride without hazardous compounds.

OBJECTS OF THE INVENTION

It is an object of the present invention to initiate the homopolymerization of aconitic anhydride by a method which readily converts the aconitic anhydride to poly (aconitic anhydride) in high yields.

It is a further object to initiate the homopolymerization of aconitic anhydride by carrying out the polymerization in the presence of an initiator which is not detonatable and therefore permits a completely safe operation.

It is still a further object of the present invention to initiate the homopolymerization of aconitic anhydride by means of an initiator which can be operated under ambient pressures and under mild conditions without requiring the use of superatmospheric, pressurized vessels.

These and other objects will be apparent from the foregoing disclosure.

SUMMARY OF THE INVENTION

We have now found that aconitic anhydride can be homopolymerized by heating said aconitic anhydride to a temperature of at least about 80° C. in the presence of an initiating amount of a mixed aconitic-acyl peroxide, having the structure:

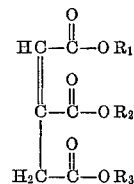

where any two of $R_1$, $R_2$ or $R_3$ are carboxylic acyl groups containing up to 7 carbon atoms or phenyl groups, and where the remaining $R_1$, $R_2$ or $R_3$ is (-o acyl) where the acyl is an aliphatic carboxylic acyl group containing up to 7 carbon atoms or a phenyl group.

DESCRIPTION OF THE INVENTION AND THE PREFERRED EMBODIMENTS

In carrying out the present invention, the mixed aconitic-acyl peroxide initiator is first prepared. A preferred method for preparing these mixed aconitic-acyl peroxides is as follows. Aconitic anhydride which has the formula:

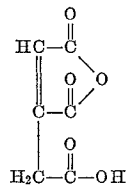

or

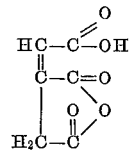

and which may be either of the above or mixtures thereof is first melted at above about 80° C. either in the presence of a solvent or in the absence of one. Hydrogen peroxide is then added to the melted aconitic anhydride.

The peroxide immediately reacts with the aconitic anhydride to form peraconitic acid having the formula:

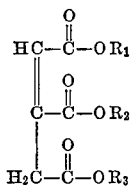

where any two of $R_1$, $R_2$ or $R_3$ are [H] groups and the remaining $R_1$, $R_2$ or $R_3$ group is [OH].

To the aconitic acid is then added an acylating agent, normally a carboxylic acid anhydride. The anhydride in turn reacts with the aconitic acid to form a mixed aconitic-acyl peroxide. A typical reaction using acetic anhydride as the acylating agent is set forth below:

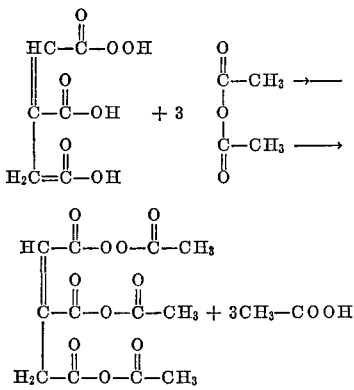

The acylation agent may be a carboxylic acid anhydride, such as acetic anhydride, benzoic acid anhydride, propionic acid anhydride, hexanoic acid anhydride and cyclohexane carboxylic acid anhydrides. Ketene can also be used as an acylating agent. The ketene can be added in proportions to supply from one to three moles of ketene per mole of peraconitic acid to form a mono-acetylated to a triacetylated product.

The carboxylic acid anhydrides useful as acylating agents may be symmetrical, as shown above, or they may be unsymmetrical, i.e., mixed carboxylic acid anhydrides. These include formyl-acetic anhydride, benzoyl-acetic anhydride, propionyl-acetic anhydride and cyclohexane carbonyl-acetic anhydride.

The acyl residue of the above-described aconitic-acyl peroxides may be either unsubstituted or substituted with groups, such as halogens, $NO_2$, $C\equiv N$ or methoxy or ethoxy groups. These may include aconitic-trifluoro-acetic, aconitic-trichloro-acetic, aconitic-monochloro-acetic, aconitic-p-nitrobenzoic, aconitic cyanobenzoic and aconitic-methoxybenzoic peroxides. Additionally, phenyl residues likewise can be substituted with lower aliphatic groups having from 1–6 carbon atoms, e.g., isopropyl benzoyl-acetic anhydride.

In carrying out the polymerization procedure, the aconitic anhydride is melted at above about 80° C. in the presence of the above-defined, mixed aconitic-acyl peroxide and the reaction permitted to take place at a temperature between 80° C. and 95° C. Since the reaction is exothermic at least during the initial reaction period, heat exchange means should be used to maintain the temperature within the desired limits. Usually, polymerization is completed within 4 to 6 hours.

The polymerization can take place by the so-called "neat" polymerization in which only the aconitic anhydride and the mixed aconitic-acyl peroxide are reacted together without a solvent; alternately, the reaction can be carried out in the presence of a suitable solvent which is non-reactive with the peroxide initiators, aconitic anhydride, or the final polymerized product. Among the suitable solvents are benzene, chlorobenzene, o-dichlorobenzene, alkyl acetates, such as butyl acetate, isopropyl acetate and the like. The solvent should have a boiling point of at least about 80° C.

In carrying out the present polymerization reaction, the mixed aconitic-acyl peroxide must be present in initiating amounts. Normally, amounts as low as about 2% by weight of the mixed aconitic-acyl peroxide, based on the weight of the aconitic anhydride present, are sufficient to initiate the reaction. However, larger amounts may be used, and, in fact, are desirable to assure the ready initiation of the aconitic anhydride polymerization reaction. Obviously, the exact initiating amount of the mixed aconitic-acyl peroxide will vary, depending upon the acyl group which is employed in making up the peroxide.

A procedure of the present invention is to add the desired amount of aconitic anhydride for reaction to a vessel, with or without a solvent, heat it to at least 80° C. and subsequently add hydrogen peroxide in amounts sufficient to react with a portion of the aconitic anhydride. Normally, the amount of hydrogen peroxide used is at least about 0.2% by weight of the aconitic anhydride starting material. Obviously, higher amounts of hydrogen peroxide can also be employed. The added hydrogen peroxide then reacts with a stoichiometric amount of aconitic anhydride to form peraconitic acid. The resulting peraconitic acid which is formed does not act as a polymerization initiator, per se. At least a stoichiometric amount of an acylating agent is then added to the aconitic anhydride. The cylating agent reacts with the aconitic acid to form the mixed aconitic-acyl peroxide. Thereafter, the mixed aconitic-acyl peroxide commences initiating the homopolymerization of the aconitic anhydride at temperatures of 80° C. and above. The resulting poly(aconitic anhydride) may have a molecular weight ranging anywhere from 350 to 1,500,-000.

Normally a slight excess of acylating agent can be employed over the stoichiometric amount necessary to react with the peraconitic acid in order to assure obtaining high yields of the mixed aconitic-acyl peroxide compound which acts as the initiator.

Purification of the resulting poly(aconitic anhydride) is easily accomplished by distilling the resulting product under reduced pressure to remove volatiles. Among the volatiles normally removed are the acyl acid corresponding to the acylating agent employed in producing the mixed aconitic-acyl peroxide in the presence of the aconitic anhydride. The resulting poly(aconitic anhydride) produced by the invention is readily soluble in non-reactive solvents such as water, acetone, tetrahydrofuran, 1,2-dimethoxyethane, alkyl acetates, methylethyl ketone, dioxane and others.

When the poly(aconitic anhydride) is dissolved in water, it convers to the poly(aconitic acid). Metallic salts of the resulting poly(aconitic acid) can be produced by well-known acid-salt conversion reactions. One simple method for producing such salts is carried out by dissolving the poly(aconitic anhydride) in water at about 100° C., neutralizing the resulting aqueous poly(aconitic anhydride) in water at about 100° C., neutralizing the resulting aqueous poly(aconitic acid) with an alkali solution, e.g., NaOH, up to a pH of 10.0; the resulting solution is heated for a period of 3 to 4 hours. Upon readjusting the pH to about 10.0, a solid alkali metal (salt) is obtained and can be recovered by stripping off the water.

EXAMPLE 1

Run A.—Process of the invention

In a 100 ml., three-neck reaction flask, equipped with a laboratory stirrer and condenser, there were placed 2.5 g. of aconitic anhydride. The flask was heated on a hot water bath to a temperature of 80–85° C. until all the aconitic anhydriode had melted. The stirrer was then started and 5 drops of 90% hydrogen peroxide were added over a period of 5 minutes. The reaction mixture was maintained at 80–85° C. for an additional 30 minutes, and then 3 ml. of acetic anhydride were added. Shortly thereafter, a polymerization reaction began which was exothermic, and a cold water bath was used surrounding the reaction flask to maintain the temperature of the reaction mixture at 90–110° C. After reacting the mixture for about 25 minutes, the rate of polymerization decreased, and hot water had to be added to the bath to maintain the temperature of the reaction mixture at about 100° C. for an additional 3–4 hours until the polymerization was complete. Hot water was then added to dissolve the reaction mixture. Thereafter, the reaction flask was connected to a vacuum system and the major portion of the by-product acetic acid and water was removed by distillation under reduced pressure. The addition of water to the aconitic anhydride polymer hydrolyzes the anhydride groups to poly(aconitic acid). A pale yellow solid weighing 28 g. was recovered and identified as poly(aconitic acid). The yield was 96% of theory, based on the aconitic anhydride feed.

Run B.—Process in which the acyl anhydride is omitted

The same procedure was repeated as set forth in Run A, except that the acetic anhydride was omitted. After maintaining the reaction mixture for 6 hours at 95° C., no polymerization was obtained. About 90% of the aconitic anhydride starting reagent was recovered unreacted.

This example demonstrates the inability of peraconitic acid, formed by reaction of the added hydrogen peroxide and a portion of the aconitic anhydride, to initiate polymerization of the aconitic anhydride.

EXAMPLE 2

The process of Example 1, Run A, was repeated except that in place of the acetic anhydride equivalent amounts of the acid anhydrides listed in Table I were used. The yield of poly(aconitic acid) is also set forth in Table I based on the aconitic anhydride feed.

TABLE I

| Acid anhydride: | Percent yield of poly(aconitic acid) |
| --- | --- |
| Propionic acid anhydride | 91 |
| Benzoic acid anhydride | 87 |
| Cyclohexane carboxylic acid anhydride | 88 |
| Trichloroacetic anhydride | 94 |
| Trifluoroacetic anhydride | 95 |

EXAMPLE 3

Process of the invention using ketene

Run A.—A 100 ml., three-neck reaction flask, supplied with a laboratory stirrer and condenser, similar to that used in Example 1, Run A, was charged with 75 g. of aconitic anhydride. The flask was heated in a hot water bath until the temperature of the aconitic anhydride was about 80° C. and had completely melted. The stirrer was then activated, and 1.0 g. of 90% $H_2O_2$ was added. The reaction mixture was maintained at 80–85° C. for an additional 10 minutes, and 3.7 g. of ketene gas was then added to the vessel. The ketene gas was produced by pyrolysis of acetone as described in detail in J. Org. Chem. 5, 122 (1940). The ketene gas was introduced through a 6 mm. glass inlet tube at a flow rate of 0.01 mole/minute for 9 minutes. The reaction mixture was stirred for an additional 5 minutes, and nitrogen was bubbled through it to remove methane gas from the flask which is produced as a by-product during the pyrolysis of the acetone. The reaction mixture was maintained at 80–100° C. for 4 hours. The product was isolated in the same manner as has been set forth in Example 1, Run A, and 80 g. of crude poly(aconitic acid) were recovered.

The yield was 92.5% of theoretical, based on the aconitic anhydride feed.

Run B.—The process of Run A was repeated except that 2.0 g. of ketene were used instead of 3.7 g. The polymerization proceeded smoothly, giving 86% yields of poly(aconitic acid), based on the aconitic anhydride feed.

EXAMPLE 4

Several mixtures of carboxylic acid anhydrides were prepared by reacting the corresponding carboxylic acids with ketene as described in detail by R. E. Dunbar and F. C. Garven in Journal of the American Chemical Society, 77, pp. 4161–2, 1955. These mixed carboxylic-acetic anhydrides were added in place of the acetic anhydride as the acylating agent following the procedure set forth in Example 1, Run A. The results are listed in Table II.

TABLE II

| Mixed anhydride acylating agent | Grams used | Grams poly-(aconitic acid) obtained | Percent yield |
| --- | --- | --- | --- |
| Benzoic-acetate | 4.0 | 26.0 | 90 |
| Formic-acetic | 3.0 | 21.0 | 73 |
| Trichloroacetic-acetic | 6.0 | 27.0 | 94 |
| m-chlorobenzoic-acetic | 6.0 | 24.0 | 84 |
| Cyclohexylcarboxylic-acetic | 6.0 | 23.0 | 80 |

Pursuant to the requirements of the Patent Statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. Process for homopolymerizing aconitic anhydride which comprises heating said aconitic anhydride to a temperature of at least about 80° C. in the presence of an initiating amount of a mixed aconitic-acyl peroxide having the structure:

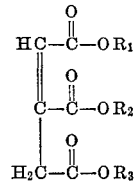

where any two of $R_1$, $R_2$ and $R_3$ are carboxylic acyl groups selected from the class of aliphatic acyl groups containing up to 7 carbon atoms, and phenyl, and where the remaining $R_1$, $R_2$ and $R_3$ is (-o acyl) wherein the acyl group is selected from the class consisting of aliphatic acyl groups containing up to 7 carbon atoms and phenyl.

2. Process of claim 1 in which the aconitic anhydride is homopolymerized at temperatures of from about 80° C. to 100° C. in the presence of at least about 2% by weight of said mixed aconitic-acyl peroxide.

3. Process of homopolymerizing aconitic anhydride which comprises melting aconitic anhydride at a temperature of at least about 80° C., adding to said aconitic anhydride from about 0.5 to 2% by weight of hydrogen peroxide, thereafter adding a member selected from the group consisting of ketene and an acyl anhydride corresponding to the mixed aconitic-acyl peroxide desired, forming a mixed aconitic-acyl peroxide and continuing to heat the remainder of the aconitic anhydride in the presence of said aconitic-acyl peroxide at a temperature of from about 80° C. to about 110° C. to form poly(aconitic anhydride).

4. Process of claim 3 wherein said poly(aconitic anhydride) is reacted with water to form poly(aconitic acid).

References Cited

UNITED STATES PATENTS 3,474,114  10/1969  Kuhlkamp et al. ____ 260—347.3

ALEX MAZEL, Primary Examiner
BERNARD I. DENTZ, Assistant Examiner

U.S. Cl. X.R.

260—610